United States Patent [19]

Jozwiak, Jr. et al.

[11] 4,055,527
[45] Oct. 25, 1977

[54] METHOD AND RESINOUS VEHICLES FOR ELECTRODEPOSITION

[75] Inventors: Edward L. Jozwiak, Jr., Gibsonia; Suryya K. Das, Pittsburgh, both of Pa.

[73] Assignee: PPG Industries, Inc., Pittsburgh, Pa.

[21] Appl. No.: 599,747

[22] Filed: July 28, 1975

[51] Int. Cl.$^2$ .................. C08L 91/00; C25D 13/06
[52] U.S. Cl. .................. 260/23.7 A; 204/181; 260/22 CB
[58] Field of Search .................. 260/23.7 R, 23.7 A, 260/22 CB

[56] References Cited

U.S. PATENT DOCUMENTS 3,258,437   6/1966   Peters .................. 526/201

Primary Examiner—Donald E. Czaja
Assistant Examiner—H. H. Fletcher
Attorney, Agent, or Firm—William J. Uhl

[57] ABSTRACT

A method of preparing resinous vehicles in aqueous medium by addition polymerizing a diene with a partially neutralized reaction product of an unsaturated carboxylic acid or anhydride and a drying oil is disclosed. The resinous vehicles are prepared in the presence of an oil-soluble free radical polymerization catalyst and have properties necessary for electrodeposition.

10 Claims, No Drawings

METHOD AND RESINOUS VEHICLES FOR ELECTRODEPOSITION

BACKGROUND OF THE INVENTION

1. Field of the Invention

The present invention relates to electrodeposition. In another aspect, the invention relates to electrodeposition employing polymers prepared by a new method in aqueous medium. More particularly, this invention relates to the polymerization of dienes in the presence of a salt of an adduct of an unsaturated carboxylic acid or anhydride and a drying oil.

2. Brief Description of the Prior Art

U.S. Pat. No. 3,258,437 discloses polymers of butadiene prepared in the presence of aqueous medium containing the salt of an adduct of a drying oil and an unsaturated dicarboxylic acid or anhydride such as maleic anhydride. These polymers are prepared in the presence of a water-soluble salt-forming free radical polymerization catalyst; and, although they are excellent resinous vehicles for many coating applications such as dip or spray coating, they are unfortunately not suitable for use in electrodeposition. The salt-forming catalyst affects the conductivity of the bath, causing the polymers to coat out at high voltages which destroys film continuity.

The present invention provides polymers which form smooth continuous films on electrocoating.

SUMMARY OF THE INVENTION

The present invention provides a resinous vehicle prepared by addition polymerizing a diene such as butadiene in the presence of an oil-soluble free radical catalyst with a partially neutralized reaction product of an unsaturated carboxylic acid or anhydride and a drying oil. The vehicles are particularly suitable for use in electrodeposition. They have high throwpower, good corrosion resistance on pretreated steel, and amazing bath stability. That is, the resin can be employed in an electrodeposition bath day after day without decomposing. Besides these advantages, the resin employs water as substantially the only solvent. Also, the resins of the invention lose little solids on baking. Less than 5 percent by weight solids are lost on baking, whereas losses as high as 25 percent are common with many electrocoating vehicles.

Besides resinous products and their method of preparation, the invention also provides for aqueous dispersions of the resinous products, for methods of electrocoating employing these aqueous dispersions, and for the resultant coated articles.

DETAILED DESCRIPTION

Various dienes which may be used in the practice of the invention include in addition to 1,3-butadiene, which is preferred, isoprene and most of the diunsaturated members of the alkylidene series including both the unsubstituted and substituted conjugated diolefins. The substituted diolefins may be those containing lower alkyl groups or halogen groups directly bonded to the alkylidene chain. Representative examples of these diolefins include chloroprene, 2,3-dimethylbutadiene, myrcene and the like. Also, mixtures of dienes can be used.

Certain advantages can be obtained by combining the diene with ethylenically unsaturated comonomers (other than the dienes mentioned above). Examples of ethylenically unsaturated comonomers are vinyl monomers which are characterized as having the $CH_2=C<$ group, and can be present in amounts of up to 65 and preferably 20 to 40 percent by weight based on total weight of reactive monomer components. Examples of the vinyl monomers which may be used are: monoolefinic and diolefinic hydrocarbons such as styrene, vinyl toluene, cyclopentadiene and the like; halogenated monoolefinic and diolefinic hydrocarbons such as alpha-chlorostyrene; esters of organic and inorganic acids such as vinyl acetate, methyl methacrylate, butyl methacrylate, ethyl acrylate, butyl acrylate, isopropenyl acetate, allyl chloride, allyl cyanide, dibutyl itaconate, ethyl alpha-chloroacrylate, and diethyl maleate; organic nitriles such as acrylonitrile, methacrylonitrile and ethacrylonitrile.

Ethylenically unsaturated comonomers containing cyclic rings such as styrene and vinyl toluene are preferred because they give compositions of improved throwpower. By throwpower is meant the property of the resinous vehicle whereby areas of the electrode being coated at varying distances from the other electrode receive substantially the same density of product. Several methods have been proposed for measuring throwpower, including the Ford Cell Test and the General Motors Cell Test, see, for example, Brewer et al, *Journal of Paint Technology*, 41, No. 535, pages 461–471 (1969); and Gilchrist et al, *American Chemical Society, Div. of Organic Coatings and Plastics Chemistry, Preprint Book*, 31, No. 1, pages 346–356, Los Angeles Meeting, March–April 1971.

The drying oils employed in the invention are esters of fatty acids which can be obtained from naturally occurring sources or which can be obtained by reacting a fatty acid with a polyol. The drying oils all contain at least a portion of polyunsaturated fatty acids. The drying oils are those oils which have an iodine value of about 90 or above as determined by ASTM D-1467 and thus include the so-called semi-drying oils. Examples of suitable naturally occurring drying oils are linseed oil, soya oil, safflower oil, perilla oil, tung oil, oiticia oil, poppy-seed oil, sunflower oil, tall oil esters, walnut oil, dehydrated castor oil, herring oil, menhaden oil, sardine oil, and the like.

Drying oils may also be obtained by reacting fatty acids with a polyol. Suitable fatty acids are oleic, linoleic and linolenic. Various polyols can be used, including butanediol, glycerol, trimethylol ethane, trimethylol propane, triethylol propane, trimethylol hexane, pentaerythritol and sorbitol.

The drying oils can be modified with other acids, including saturated, unsaturated or aromatic acids such as butyric acid, stearic acid, oleic acid, phthalic acid, isophthalic acid, terephthalic acid, rosin or benzoic acid or anhydride of such an acid. These acid-modified oils are made by transesterification of the ester as by forming a dior monoglyceride by alcoholysis, followed by esterification with the modifying acid.

Also included among the dryng oils are alkyd resins prepared utilizing drying oil; esters of epoxide with fatty acids, such as those mentioned above, including ester of diglycidyl esters of polyhydric compounds, as well as other mono-, di- and polyepoxides; and drying oil fatty acid esters of resinous polyols such as homopolymers or copolymers of unsaturated aliphatic alcohols, for example, allyl alcohol or methallyl alcohol including copolymers of such alcohols with styrene or other ethylenically unsaturated monomers. Esters of epoxies with fatty acids such as esters formed from linoleic acid and epichlorohydrin-Bisphenol A condensates are particularly desirable for use in electrodeposition.

The unsaturated carboxylic acid utilized in forming the adduct can be an alpha, beta-ethylenically unsaturated dicarboxylic acid or its anhydride such as maleic acid, fumaric acid, itaconic acid, maleic anhydride and itaconic anhydride. Mixtures of the same or different acids and anhydrides may also be utilized. Ordinarily, the acid and anhydride employed should contain from abut 4 to 12 carbon atoms, although longer chain compounds can also be employed if desired.

In preparing the adduct of the carboxylic acid or anhydride and the drying oil, about 14 percent to 45 percent by weight of the unsaturated acid or anhydride should be reacted with from about 55 percent to 86 percent by weight of the drying oil. If less than 14 percent by weight of the unsaturated acid or anhydride is employed, the adducts will only be partially water soluble unless water-soluble organic solvents are employed to give water solubility. Even when so formulated, however, such adducts will not give films which possess the desired degree of hardness required in protective coatings for metallic surfaces, and may not have adequate corrosion resistance. If more than 45 percent of acid or anhydride is used, the resultant films will be seriously deficient in water resistance.

While the exact nature of the reaction product of the unsaturated acid or anhydride with the drying oil is not known with certainty, it is believed that the reaction takes place by addition with the unsaturated linkage of the acid or anhydride to the carbon chain of the oil. In the case of unconjugated double bonds, such as are present in linseed oil, the reaction may take place with the methylene group adjacent the nonconjugated double bond. In the case of oils having conjugated double bonds, such as tung oil, the reaction is probably of the Diels-Alder type.

The reaction between the acid or acid anhydride and the drying oil takes place readily without the use of catalyst and at temperatures within the range of 200° to about 275° C., with the reaction preferably being carried out between about 220° and about 250° C.

The adduct of the drying oil with the acid or acid anhydride component can be modified by partially esterifying the carboxylic acid groups. For example, esterification can take place with alcohol such as is described in U.S. Pat. No. 3,369,983 to Hart et al, or with a polyol such as described in U.S. Pat. No. 3,537,969 to Jerabek, the disclosures of which are incorporated by reference. Partial esterification modifies film properties and in certain instances has been found to increase throwpower.

The adduct obtained from the above reactants is not dispersible in water. To make the material water dispersible, the acidity of the adduct has to be at least 25 percent neutralized with a water-soluble inorganic base such as sodium or potassium hydroxide or an organic base such as ammonia or water-soluble amine or quaternary ammonium hydroxide. Among the amines which may be utilized are water-soluble primary, secondary and tertiary amines such as methylamine, ethylamine, propylamine, dimethylamine, diethylamine, dipropylamine, trimethylamine, triethylamine, tripropylamine, monoethanolamine, monobutanolamine, diethanolamine, dibutanolamine, triethanolamine, tributanolamine and the like. Examples of the quaternary ammonium hydroxides which may be employed include tri-methyl benzyl ammonium hydroxide and trimethyl lauryl ammonium hydroxide.

Preferably, the pH of the water-dispersed, neutralized and solubilized adduct should be maintained in the range of 8.0 to 9.2. If the pH is substantially lower than 8.0, a physical separation of the dispersion takes place.

The resinous compositions of the instant invention are prepared by simply admixing the diene or the diene plus vinyl monomer in water with an oil-soluble free radical-type catalyst, and the amine or ammonia solubilized salt of the adduct of the drying oil and the unsaturated carboxylic acid or anhydride. The reaction mass is then heated for a period of about 2 to 20 hours.

In order to obtain a product suitable for use in electrodeposition, it is desirable that the salt of the adduct of the drying oil and unsaturated carboxylic acid or anhydride be present in amounts of at least 5 and preferably 20 to 75 percent by weight of the total reactants.

As has been mentioned above, polymerization of the diene with the salt of the adduct of a drying oil and a carboxylic acid or anhydride is conducted in the presence of an oil-soluble free radical-type catalyst. These types of catalysts have been found to give products suitable for electrodeposition. Water-soluble salt-type free radical catalyst such as disclosed in the aforementioned U.S. Pat. No. 3,258,437 to Peters et al are unsuitable.

Examples of suitable oil-soluble catalysts include azobisisobutyronitrile, cumene hydroperoxide, diisopropylbenzene hydroperoxide, diazothioether, para-methoxyphenyl diazothio-(2-naphthyl) ether and para-chlorobenzyl peroxide. Cumene hydroperoxide and azobisisobutyronitrile are the preferred free radical initiators. These catalysts bring about an approximately 100 percent conversion of the diene into polymer product. Other free radical polymerization catalysts such as others mentioned above have not been found to give as high a conversion.

Besides the free radical catalyst, a chain terminator such as tertiary-dodecyl mercaptan, 2-mercaptoethanol, isooctyl mercaptopropionate, para-octyl mercaptan, or 3-mercaptopropionic acid is preferably incorporated into the polymer charge. Chain terminators provide the necessary control over molecular weight to give products having the required viscosity for electrodeposition. Tertiary-dodecyl mercaptan is preferred because it results in high conversion of diene into polymer product. Other chain terminators such as those mentioned above give lower conversions.

For electrodeposition, the above-described resinous products are dispersed in water to about 1 to 30 percent by weight resin solids aqueous dispersions. The term "aqueous dispersion" as used within the context of the present invention is intended to cover two-phase, translucent, aqueous-resin systems, especially those in which the aqueous phase forms the continuous phase, and is also intended to cover homogeneous aqueous solutions which appear optically clear. The aqueous dispersions of the present invention have dispersed phases which have average particle size diameters of about 0.1 to 5 microns. The dispersed phase may be spherical or elongated in shape or actually invisible by microscopic investigation.

The products can be employed as such to electrodeposit clear films, but ordinarily they are used as a vehicle along with a pigment composition. The pigment composition used may be of any conventional type, comprising, for example, iron oxides, lead oxides, strontium chromate, carbon black, titanium dioxide, talc, barium sulfate and the like, as well as combinations of these and similar pigments. Color pigments such as cadmium yellow, cadmium red, phthalocyanine blue, chromic yellow, toluidine red, hydrated iron oxide and the like may also be included. Dispersing or surface active agents which should be of non-ionic or anionic type or a combination of these types can also be employed.

Usually, the pigment and surface active agent, if used, are ground together in a portion of the vehicle to make a paste, and this is blended with the major portion of the vehicle to produce the coating composition. There may also be included in the coating compositions additives such as anti-oxidants, wetting agents, dryers, anti-foaming agents, suspending agents and the like. It is often desirable to include small amounts of water-miscible organic solvents, which may be added to the resinous vehicle to aid in handling and processing. 4-Methoxy-4-methyl-pentanone-2 is a preferred solvent of this type, but others, such as dioxane and glycol ethers, can also be used.

It has been found that in most instances desirable coatings are obtained using pigmented compositions containing weight ratios of pigment to vehicle of not higher than about 1.5 to 1 and preferably not higher than about 1 to 1. If the composition has too high a pigment-to-vehicle ratio, the electrodeposited film may exhibit poor flow characteristics.

In formulating the water-dispersed compositions, ordinary tap water may be employed. However, such water may contain relatively high levels of cations, which, while not ordinarily rendering the process inoperative, may result in variations in the properties of the bath when used for electrodeposition. In such cases, it is often desirable to utilize deionized water from which the free ions have been removed, as by passage through an ion exchange resin.

The compositions such as described above are applied by placing the aqueous bath containing the composition in contact with an electrically conductive anode and an electrically conductive cathode and passing an electric current between the electrodes. The electrodes may be of any electrically conductive material, usually metal such as iron, steel, aluminum, galvanized steel, phophatized steel, zinc, copper, or other metal. Other electrically conductive materials or non-conductive materials such as glass, plastics, etc. having a surface made conductive by application of a conductive coating or a layer, can also be coated in accordance with the invention. Upon passage of electric current between the anode and the cathode, while in contact with the bath containing the coating composition, an adherent film of the coating composition is deposited on the anode.

Generally speaking, the conditions under which the electrodeposition process is carried out are those conventionally used in the electrodeposition methods employed heretofore. The applied voltage may be varied greatly and can be very low, for example, 1 volt, or very high, for example, several thousand volts or even higher. Particularly advantageous of the products herein is that they permit the use of higher voltage without the problems usually encountered; thus, they are often electrodeposited from about 200 to about 500 volts.

Electrodeposition produces an adherent film which is very high in solids content, often 80 to 90 percent or even higher, which provides the important advantage that the film will not readily run or wash. Although the articles so coated can be used, if desired, without additional baking or other drying procedures, additional baking or drying of the film is usually accomplished inasmuch as there is little or no solvent to be evaporated from the film. Ordinarily, the coated articles are baked at a temperature of about 125° C. to about 200° C. for about 10 minutes to 30 minutes.

The invention will be described further in conjunction with several examples showing the method and practice of the invention. These examples, however, are not to be construed as limiting the invention to their details. All parts and percentages by weight are based upon nonvolatile solids content unless otherwise indicated.

EXAMPLE I

An epoxy-fatty acid ester was prepared by charging the following to a glass reactor:

| Charge | Parts by Weight |
| --- | --- |
| EPON 828[1] | 1730 |
| PAMOLYN 200[2] | 5500 |
| xylene | 172 |
| benzyl dimethylamine | 6 |
| stannous octoate | 6 |

[1] Condensation product of epichlorohydrin and Bisphenol A, having an epoxide equivalent of about 185–192, commercially available from Shell Chemical Company.
[2] A fatty acid composition containing 17 percent by weight oleic acid, 70 percent by weight linoleic acid, and 11 percent by weight conjugated linoleic acid, which is commercially available from Hercules Inc.

The charge was heated to about 195° C. and held for 1 hour and then raised to about 250° C. and maintained at this temperature until an acid value of 5.92 was obtained. The reaction mixture was sparged with nitrogen for 15 minutes and then cooled to room temperature, at which time 1340 parts by weight of maleic anhydride was added to the reactor. The reaction mixture was then heated to about 225° C. and held for two hours and then sparged with nitrogen for approximately 15 minutes. The reaction mixture was cooled to room temperature. The epoxy-fatty acid ester had a Gardner-Holdt viscosity at 75 percent solids in xylene of Y-. The epoxy-fatty acid ester at 100 percent solids was dispersed to a solution of water and triethylamine (15.75 percent by weight based on weight of epoxy-fatty acid ester) to form a 30 percent by weight resin solids solution.

EXAMPLE II

The following was charged to a reaction vessel capable of maintaining pressure.

| Charge | Parts by Weight |
| --- | --- |
| epoxy-fatty acid ester of | |
| Example I (39.5% resin solids) | 71.3 |
| deionized water | 110.2 |
| styrene | 25.7 |
| azobisisobutyronitrile | 2.6 |
| tertiary-dodecyl mercaptan | 2.6 |
| surfactant mix[1] | 5.8 |

[1] The surfactant mix comprised 5.8 parts by weight of a fluorocarbon commercially available from 3M Corporation as FC-430, 283.0 parts by weight of deionized water and 1.1 parts by weight of triethylamine.

Sixty parts by weight of 1,3-butadiene was charged to the reaction mixture under 30 pounds per square inch gauge pressure using a gear pump. The reaction mixture was then heated to 73° C. and held for about 10 hours, after which time the reaction mixture was cooled to room temperature.

The reaction product prepared as described above was then diluted with deionized water to form a 20 percent solids electrodeposition bath. Steel panels electrocoated with this bath at a bath temperature of 23° C. for 2 minutes at 400 volts produced smooth, hard coatings of approximately 1 mil thickness.

EXAMPLE III

The following ingredients were charged to a reaction vessel suitable of maintaining pressure.

| Charge | Parts by Weight |
|---|---|
| epoxy-fatty acid ester of Example I | 3194.2 |
| fatty acid soap mixture[1] | 942 |
| deionized water | 6880 |
| cumene hydroperoxide | 78.7 |
| tertiary-dodecyl mercaptan | 78.7 |
| styrene | 1181.0 |
| 1,3-butadiene | 2755.5 |
| surfactant mix (see Example I) | 29.5 |

[1]Adduct of 329.7 parts by weight of fatty acid mixture of 17 percent by weight oleic acid, 42 percent by weight linoleic acid, 40 percent by weight conjugated linoleic acid, which is commercially available from Hercules Inc. as PAMOLYN 300, and 118 parts by weight of triethylamine dispersed in 329.5 parts of isopropanol and 164.8 parts of deionized water.

The charge was heated to 77° C. and maintained for 4 hours, after which time an additional 19.7 parts by weight of cumene hydroperoxide was added. The temperature was raised to 190° C. over a 2-hour period and an additional 19.7 parts by weight of cumene hydroperoxide added. The temperature was maintained between 172°–190° C. for an additional two hours and a final 19.7 parts by weight of cumene hydroperoxide added. The reaction mixture was then cooled to room temperature. The resinous mixture had a pH of 7.8, a Brookfield viscosity of 7 centipoises and a solids content of 38 percent.

EXAMPLE IV

A pigment grind (A) ground to a 7.25 Hegman was prepared from the following charge:

| Charge | Parts by Weight |
|---|---|
| grinding vehicle[1] | 5335.8 |
| red iron oxide | 2853.3 |
| coal dust | 950.7 |
| lead silicate | 557.4 |
| strontium chromate | 290.3 |

[1]The grinding vehicle was a 39.5 percent resin solids solution prepared as described in Example I with the exception that diethylamine was used for solubilization instead of triethylamine.

To the pigment grind (A), prepared as described above, was added the following mixture (B):
1336 parts of pine tar
87 parts of triethylamine
425 parts of 4-methoxy-4-methylpentanone To the mixture of (A) and (B) was added 268 parts of 2,6-ditertiarybutyl-4-methylphenol (anti-oxidant), 268 parts of 4-methoxy-4-methylpentanone and 1294 parts of the grinding vehicle described immediately above to form a pigment paste.

An electrodeposition bath was prepared by dispersing 276 parts by weight of the pigment paste with 8.4 parts by weight of triethylamine and 1696.6 parts by weight of an aqueous dispersion of resinous vehicle of Example III (34 percent solids) in 1706 parts by weight of deionized water to yield a bath of 20 percent solids and a pH of 9.55. The bath had a rupture voltage of greater than 550 volts and a General Motors throwpower of 13¼ inches deposited with a 17 inch dip.

Both untreated and zinc phosphated steel panels were coated with this bath, bath temperature 18.5° C., at 350 volts for 2 minutes to give a film of 0.65 mil thickness. After 14 days salt spray exposure under conditions described in ASTM B-117-73, the coated, untreated steel panel showed 1½ inch creep from the scribe line and the treated steel panel showed about 1/64 to 1/16 inch creep from the scribe line.

EXAMPLE V

An electrodeposition bath was prepared by dispersing 303.6 parts by weight of the pigment paste prepared as described in Example IV with 9.2 grams of triethylamine and 1595 parts by weight of the resinous vehicle of Example II (40 percent solids) in 2075 parts by weight of deionized water to yield a bath of 20 percent solids and a pH of 9.4–9.55. The bath had a rupture voltage of greater than 550 volts and a General Motors throwpower of 14¾ inches deposited with a 17 inch dip.

Both untreated and zinc phosphated steel panels were coated with this bath, bath temperature 18.5° C., at 500 volts for 2 minutes to give a film of 0.6–0.7 mil thickness. After 14 days salt spray exposure under conditions described in ASTM B-117-73, the coated, untreated steel panels showed 1½ inch creep from the scribe line and the untreated steel panels showed about 1/64 to 1/16 inch creep from the scribe line.

EXAMPLE VI

A resinous product prepared according to U.S. Pat. No. 3,258,437 was evaluated for electrocoating. A maleinized linseed oil backbone was first prepared as described in Example IV of U.S. Pat. No. 3,258,437. The Gardner-Holdt viscosity of the product was Z, somewhat higher than the K reported in the example. Styrene and butadiene were then reacted with the product as generally described in Example VI of the patent to form a resinous composition which was diluted with additional water to form a 15 percent solids electrodeposition bath. Electrodeposition was conducted on a series of steel panels at varying voltages until a drop-off in amperage was observed. This voltage was then selected for electrocoating. Steel panels were electrocoated with a 15 percent solids bath at a temperature of 23° C. for two minutes at 300 volts. The coated panels were then baked for 20–25 minutes at 177° C. to give rough, thick, uneven and cratered coatings, looking like burned toast.

EXAMPLE VII

A resinous product was prepared according to Example II above with the exception that 2.6 parts by weight of potassium persulfate was used instead of the azobisisobutyronitrile. Electrodeposition was conducted as generally described above in Example IV with a 15 percent solids bath at a temperature of 23° C. for 2 minutes at 20 volts. The coated panels were baked for 20–25 minutes at 177° C. to give coatings similar in appearance to those described above in Example VI.

EXAMPLE VIII

A resinous product similar to Example VI above was prepared with the exception that azobisisobutyronitrile was used instead of the potassium persulfate free radical catalyst. The charge for preparing the product was as follows:

| Charge | Parts by Weight |
|---|---|
| maleinized linseed oil (see Example VI) | 135.0 |
| ammonium hydroxide | 1.1 |
| deionized water | 320.0 |
| azobisisobutyronitrile | 2.2 |
| styrene | 64.8 |
| butadiene | 151.2 |

Six hundred twenty-three parts by weight of the resinous product prepared as described above was diluted with 1177 parts by weight of deionized water to form an electrodeposition bath. Electrodeposition was conducted on zinc phosphated steel panels, untreated steel panels and aluminum panels at 300 volts for two minutes at a bath temperature of 23° C. The coated panels were then baked for 20 to 30 minutes at 177° C. to give smooth coatings of about 0.7 mil thickness.

EXAMPLE IX

The resinous product of Example VIII was prepared again with the exception that tertiary-dodecyl mercaptan, a chain transfer agent, was present in the charge. The charge was as follows:

| Charge | Parts by Weight |
|---|---|
| maleinized linseed oil | 135.0 |
| ammonium hydroxide | 1.1 |
| deionized water | 310.0 |
| azobisisobutyronitrile | 6.5 |
| tertiary-dodecyl mercaptan | 6.5 |
| styrene | 64.8 |
| 1,3-butadiene | 151.2 |

Six hundred parts by weight of the resinous product was diluted with 1400 parts by weight of deionized water to form an electrodeposition bath. Electrodeposition was conducted on zinc phosphated steel panels, untreated steel panels and aluminum panels at voltages of from 280 to 300 volts for two minutes, bath temperature 23° C. The coated panels were then baked for 20 to 30 minutes at 177° C. to give smooth films of approximately 1 mil thickness.

We claim:
1. A process for preparing a resinous vehicle suitable for electrodeposition which comprises:
   A. addition polymerizing a diene, in the presence of an oil-soluble free radical polymerization catalyst, in aqueous medium with
   B. an at least 25 percent neutralized reaction product of:
      1. not more than about 45 percent by weight of an unsaturated dicarboxylic acid or its anhydride with
      2. at least about 55 percent by weight of a drying oil which has an iodine value of about 90 and above.
2. The process of claim 1 in which the diene is 1,3-butadiene.
3. The process of claim 1 in which the addition polymerization of the diene is carried out in the presence of at least one other ethylenically unsaturated monomer.
4. The process of claim 3 in which the other ethylenically unsaturated monomer is styrene.
5. The process of claim 1 in which the free radical polymerization catalyst is selected from the class consisting of azobisisobutyronitrile and cumene hydroperoxide.
6. The process of claim 1 in which the polymerization is carried out in the presence of a chain transfer agent.
7. The process of claim 6 in which the chain transfer agent is tertiary-dodecyl mercaptan.
8. The process of claim 1 in which the drying oil is an ester of a polyepoxide and a fatty acid.
9. The process of claim 1 in which the unsaturated carboxylic acid or anhydride is maleic acid or anhydride.
10. An aqueous dispersion containing 1 to 30 percent by weight resin solids of the resinous vehicle of claim 1.

* * * * *

UNITED STATES PATENT AND TRADEMARK OFFICE
CERTIFICATE OF CORRECTION

PATENT NO. : 4,055,527

DATED : October 25, 1977

INVENTOR(S) : Edward L. Jozwiak, Jr. and Suryya K. Das

It is certified that error appears in the above-identified patent and that said Letters Patent are hereby corrected as shown below:

Column 2, line 57, "dior" should be --di- or--.

Column 2, line 62, "ester" should be --esters--.

Column 3, line 11, "abut" should be --about--.

Column 5, line 45, "phopha-" should be -- phospha- --.

Column 8, line 30, "untreated" should be --treated--.

Signed and Sealed this

Seventh Day of March 1978

[SEAL]

Attest:

RUTH C. MASON
Attesting Officer

LUTRELLE F. PARKER
Acting Commissioner of Patents and Trademarks